UNITED STATES PATENT OFFICE.

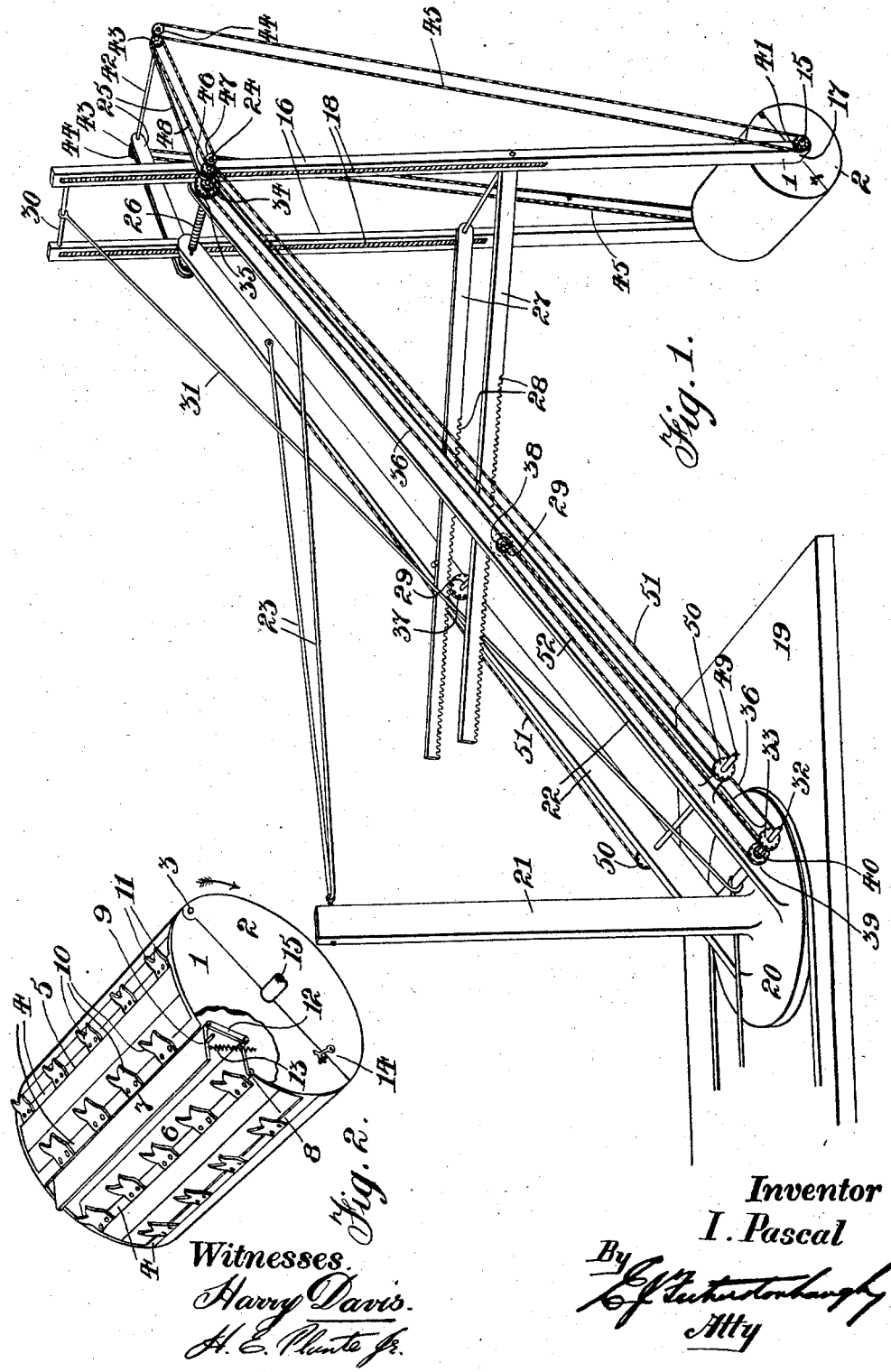

ISRAEL PASCAL, OF MONTREAL, QUEBEC, CANADA, ASSIGNOR OF ONE-FOURTH TO CHARLES PASCAL, ONE-FOURTH TO GEORGE ANTOINE BILOT, AND ONE-FOURTH TO LYON WILLIAM JACOBS, ALL OF MONTREAL, CANADA.

EXCAVATOR.

1,003,149.      Specification of Letters Patent.      Patented Sept. 12, 1911.

Application filed December 16, 1910. Serial No. 597,696.

*To all whom it may concern:*

Be it known that I, ISRAEL PASCAL, a subject of the King of Great Britain, and resident of 20 Rivard street, in the city and district of Montreal, Province of Quebec, in the Dominion of Canada, have invented certain new and useful Improvements in Excavators, of which the following is a specification.

The invention relates to improvements in excavators, as described in the present specification and illustrated in the accompanying drawings that form part of the same.

The invention consists essentially in the novel construction and arrangement of parts, whereby the earth is removed by a rotatable digger, readily adjustable to any position, and gathering said earth into the interior thereof during rotation, to be subsequently elevated and discharged.

The objects of the invention are to provide a machine capable of removing all kinds of earth quickly and with the use of a minimum power, and generally to provide a machine for this purpose of simple, cheap and durable construction.

In the drawings, Figure 1 is a perspective view of the machine, showing the driven shafts and supporting platform broken away. Fig. 2 is a perspective detail of the rotary digger, showing one side broken away to disclose the interior.

Like numerals of reference indicate corresponding parts in each figure.

Referring to the drawings, 1 and 2 are the halves of the heads of the cylindrical digger, pivotally jointed at one end of the split by the pivot rod 3. 4 are staves spaced apart and rigidly secured to said heads 1 and 2, forming the longitudinal ingress openings 5 therebetween. 6 and 7 are a pair of flap doors closing said openings 5, said doors 6 being hinged at 8 directly to one of the longitudinal edges of the openings 5 and the other door 7 being secured in the heads 1 and 2 by the central pivots 9, said doors meeting centrally.

10 are tines formed of strips of metal riveted to the staves 4 and outwardly curved from one of the longitudinal edges of the openings 5 and extending slightly over said openings, said tines at their outer ends are fish-tailed to form teeth 11. The tines 10 are spaced apart on the staves 4 in such arrangement that the tines on one stave come between the tines of the next stave, so that in the rotation of the digger, a quantity of earth will be cut the whole width of the digger.

12 are levers arranged at each end of the digger adjacent to the heads 1 and 2 and connecting the outer ends of the doors 7 beyond the pivot points to the inner end of the doors 6. In this manner, when the door 6 is forced inwardly by the pressure of earth entering the digger, the door 7 will be forced outwardly. 13 are springs having one end connected to the doors 7 inwardly of the pivots 9 and the other end connected to the heads 1 and 2. It will be thus seen that each bite of earth gathered by a row of tines is directed by said tines against a door 6, said door being forced inwardly and coincidently swinging the pivoted door 7 outwardly by means of the lever connections between said doors. On the further rotation of the digger, the earth gathered by the aforesaid tines will be forced inside the digger by the automatic spring closing of the doors. 14 is a fastener of any suitable kind, holding the halves 1 and 2 in their closed position, and here shown as a well known hook and eye fastening. 15 is a shaft rigidly secured to the halves 2 and extending centrally through the said cylindrical digger, the other halves 1 closing up on said shaft and said shaft extending beyond the heads of the digger at each end thereof. 16 are a pair of parallel carrier arms carrying at their lower end the bearings 17 in which the shaft 15 is journaled, carrying said cylindrical digger.

18 are racks longitudinally arranged on the arms 16 for the greater part of their length.

19 is a truck platform.

20 is a turn table pivotally mounted on the platform 19.

21 is a central post extending upwardly from the turn table 20.

22 are a pair of crane arms projecting angularly from the turn table 20 and rigid therewith.

23 are guys extending from the central post 21 to each of the arms 22 adjacent to the upper end thereof.

24 is a shaft journaled at the upper ends of the crane arms 22.

25 are a pair of short arms projecting outwardly from the shaft 24 and rigid therewith and secured to said shaft outside of the arms 22. The arms 16 project upwardly between the upper ends of the arms 22 and the inner ends of the arms 25. 26 is a coil spring encircling the shaft 24 and holding said arms 25 to their upward position, one end of said spring being secured to an arm 22 and the other end to said shaft.

27 are a pair of pressure arms at one end pivotally connected to the projectory arms 16 intermediate of the length thereof and at the other end extending between the crane arms 22.

28 are racks extending along the under sides of the arms 27 for the greater portion of their lengths.

29 is a shaft journaled in bearings supported intermediate of the length of the crane arms 22 and supporting the pressure arms 27.

30 is a tie rod connecting the upper ends of the carrier arms 16.

31 is a guy cable connected to the tie rod 30 at one end and at the other end secured to the turn table 20.

32 is a driving shaft journaled in the arms 22 adjacent to the lower end thereof.

33 are sprockets fixedly mounted on the shaft 32, one at each end thereof.

34 are sprockets loosely mounted on the shaft 24 toward each end thereof, each of said sprockets carrying from one of its side faces a gear wheel 35, the latter coacting with the racks 18.

36 are sprocket chains operatively connecting the sprocket wheels 33 and 34, thus providing a raising and lowering gear for the rotary digger.

37 are gears fixedly mounted on the shaft 29 and coacting with the racks 28.

38 is a sprocket wheel fixedly mounted on one end of the shaft 29 to the outside of one of the arms 22.

39 is a sprocket wheel loosely mounted on the driven shaft 32 and carrying on one face thereof the gear 40, said gear being driven independently of said shaft 32 preferably by another gear, not shown, operatively connected with a driving engine.

41 are sprocket wheels fixedly mounted on the outer ends of the digger shaft 15 outside of the arms 16.

42 is a shaft journaled in the outer ends of the short arms 25 and having rigid therewith at each end thereof, a pair of sprocket wheels 43 and 44.

45 are chains operatively connecting the sprocket wheels 41 and 44.

46 and 47 are pairs of sprocket wheels, each pair being suitably mounted on a sleeve encircling the outer ends of the shaft 24.

48 are chains operatively connecting the sprockets 47 and the sprockets 43.

49 is a driven shaft journaled in suitable bearings at the lower end of the arms 22. 50 are sprocket wheels fixedly mounted at each end of said shaft 49.

51 are chains operatively connecting the sprocket wheels 50 with the sprocket wheels 46.

52 are chains operatively connecting the sprocket 39 with the sprocket 38.

In the operation of this invention, the shaft 49 is suitably driven, thereby rotating the pinions 46 and 47 through the medium of the sprockets 50 and chains 51. The sprockets 43 and 44 will also rotate through the medium of the sprockets 47 and chains 48. The rotation of the sprockets 43 causes the rotation of the shaft 42 and thereby the rotation of the digger through the medium of the sprockets 44 and 41 and chains 45, this rotation being in the direction indicated by the arrow in Fig. 2. The projectory arms 16 must now be so moved as to project the rotating digger against the earth to be excavated, and this is accomplished by suitably turning the shaft 32 and thereby the gear wheels 35 through the medium of the sprockets 39 and 34 and the chains 36. The gear wheels 35 being in engagement with the racks 18, the projectory arms 16 will be raised or lowered according to the direction in which the shaft 32 is turned. If necessary the lower end of the arms 16 and thereby the rotating digger may be pushed forwardly or pulled rearwardly against the earth by the pressure arms 27, said arms as before mentioned being connected with the arms 16, and this is accomplished by suitably driving the gear wheel 40, thereby turning the gears 37 through the medium of the sprockets 38 and 39 and the chains 52.

The short arms 25 are spring held to their upward position by the springs 26, and it will be seen that, no matter what is the angle of the arms 16, whether raised or lowered, there will always be the requisite connection between the sprockets 41 of the rotary digger and the driven shaft 49, the said spring 26 always keeping the chains 45 taut.

When the rotary digger becomes full of earth, the various arms and cable are operated and the turn table rotated so as to bring the digger into position over a cart or the like, where the contents of the digger are dumped on the release of the fastening 14, said digger being thereby opened up.

What I claim as my invention is:

1. In an excavator, a rotary digger having a plurality of longitudinal openings suitably spaced, tines rigidly secured between said openings and extending partly thereover, doors closing said openings, arms adjustably arranged and carrying said digger and means for rotating said digger.

2. In an excavator, a rotary digger having a plurality of longitudinal openings thereacross, tines extending outwardly from the pieces between said openings, a pair of carrier arms carrying said digger at the ends thereof, a pair of crane arms supporting said carrier arms, means for adjusting the position of said carrier arms and means for driving said rotor.

3. In an excavator, a rotary digger having a plurality of longitudinal openings, tines projecting outwardly from pieces between said openings and doors closing said openings, a pair of parallelly arranged carrier arms carrying said rotor at the ends thereof, a pair of adjustable crane arms, means for raising and lowering said carrier arms on said crane arms, means for projecting said carrier arms from said crane arms and means for rotating said digger.

4. In an excavator, a rotary digger having a plurality of longitudinal openings, tines projecting from the pieces between said openings and doors closing said openings, a pair of parallelly arranged carrier arms carrying said digger at the lower and outer ends, racks secured to the inner sides of said carrier arms, crane arms adjustably arranged, a shaft journaled at the upper end of said crane arms, gears mounted on said shaft and coacting with said racks, means for driving said gears, pressure arms engaging said carrier arms intermediate of the length thereof and means for rotating said digger.

5. In an excavator, a rotary digger of drum formation having a plurality of longitudinal openings therethrough, tines secured to the pieces between said openings and doors closing said openings, a pair of parallel carrier arms carrying said digger at the lower and outer ends thereof, racks secured to the inner sides of said carrier arms, a pair of crane arms adjustably arranged, a shaft extending across through said crane arms at the upper end thereof, gears mounted on said shaft and coacting with said racks, a frame spring-held upwardly and extending outwardly from the top of said crane arms, a shaft journaled at the outer end of said frame, a chain and sprocket drive operatively connecting said frame shaft to the digger and driven shaft at the lower end of said crane arms and chain and sprocket drives connecting said driven shaft with said gears and said frame shaft.

6. In an excavator, a rotary digger of drum formation split centrally and having longitudinal openings, tines extending from the pieces between said openings and doors closing said openings, a shaft carrying said drum, and a pair of parallel carrier arms carrying bearings for said drum shaft at the lower and outer ends thereof, crane arms adjustably arranged, means for raising and lowering said projectory arms at the outer end of said crane arms, a pair of pressure arms pivotally secured to said carrier arms intermediate of the length thereof, racks secured to the undersides of said pressure arms, gears suitably journaled and supported intermediate of the length of said crane arms coacting with said racks, means for driving said gears, a plurality of driven shafts and means connecting one of said driven shafts to said rotor and flexibly arranged.

7. In an excavator, a rotary digger of drum formation having a plurality of stave members forming longitudinal openings, tines secured to said stave members and projecting outwardly therefrom and flap doors meeting centrally in said openings and pivotally secured, one of said doors opening inwardly and the other outwardly, said drum being split centrally, supporting arms carrying bearings for said digger, means for driving said digger and means for carrying said arms.

8. In an excavator, a rotary digger of drum formation having stave members suitably spaced forming longitudinal openings, tines projecting outwardly and doors closing said openings, said doors meeting centrally, one of said doors being hinged to a stave member and opening inwardly and the other door being pivoted in the heads of the drum and opening outwardly, a lever connecting said doors, a spring connecting one of said doors to the head for closing purposes, arms carrying said digger and means for rotating said digger.

Signed at the city of Montreal, Quebec, Canada, this tenth day of December, 1910.

ISRAEL PASCAL.

Witnesses:
H. DAVIS,
F. A. BINNS.

---

Copies of this patent may be obtained for five cents each, by addressing the "Commissioner of Patents, Washington, D. C."